G. H. F. BERGLUND & H. A. H. LINDENCRONA.
MRS. H. M. U. LINDENCRONA, WIDOW AND HEIRESS OF H. A. H. LINDENCRONA, DEC'D.
AUTOMATIC CAR COUPLING.
APPLICATION FILED JUNE 16, 1910.
1,173,644.
Patented Feb. 29, 1916.
4 SHEETS—SHEET 2.
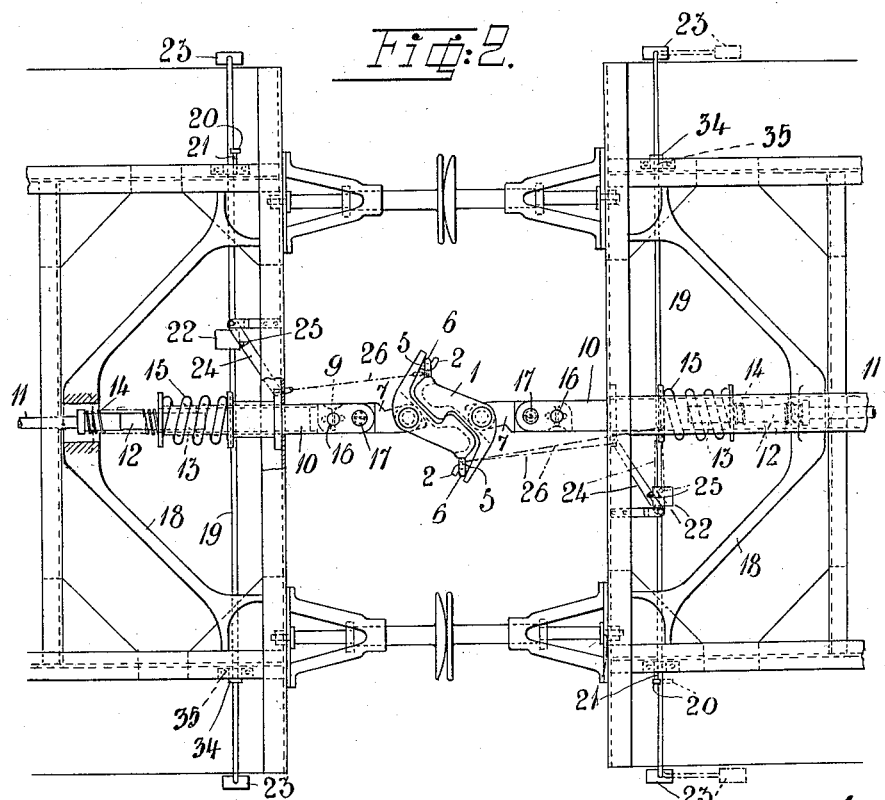

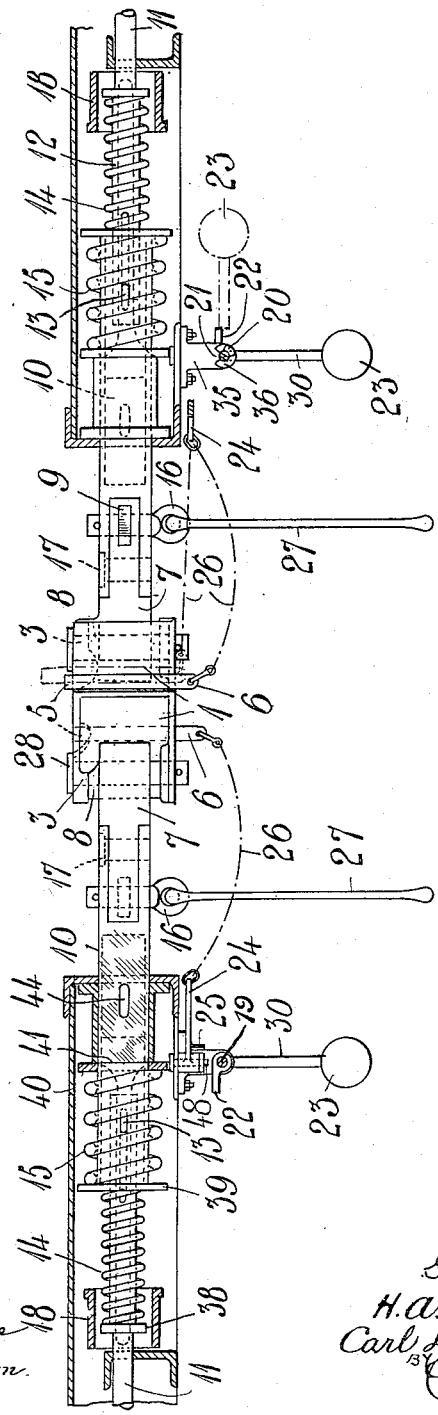

G. H. F. BERGLUND & H. A. H. LINDENCRONA.
MRS. H. M. U. LINDENCRONA, WIDOW AND HEIRESS OF H. A. H. LINDENCRONA, DEC'D.
AUTOMATIC CAR COUPLING.
APPLICATION FILED JUNE 16, 1910.
1,173,644.
Patented Feb. 29, 1916.
4 SHEETS—SHEET 3.
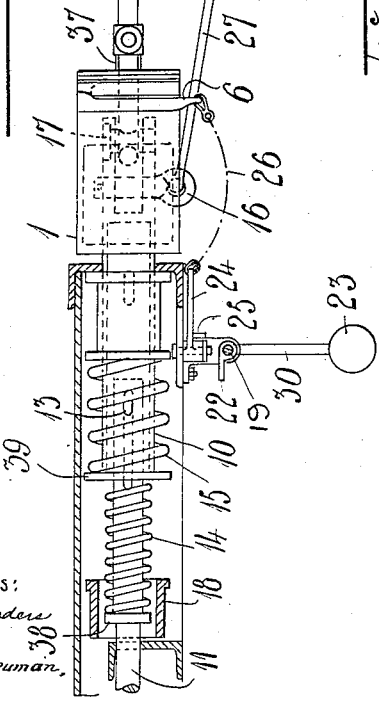
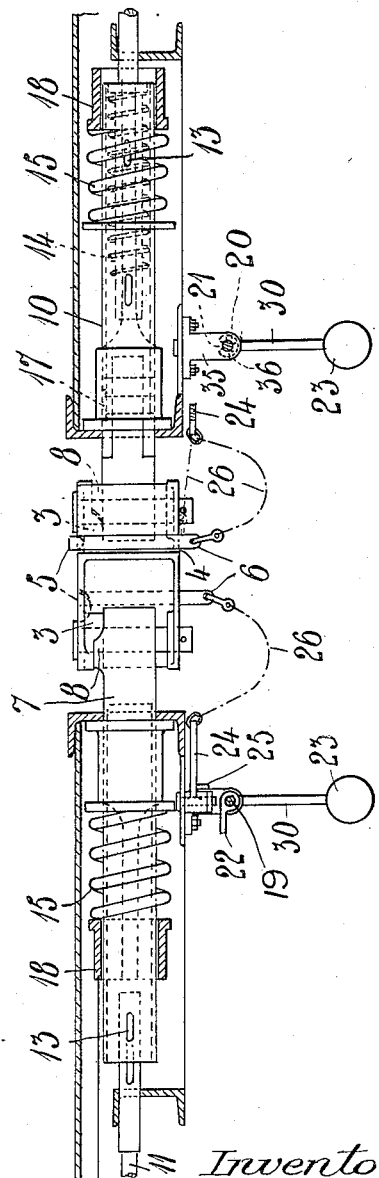

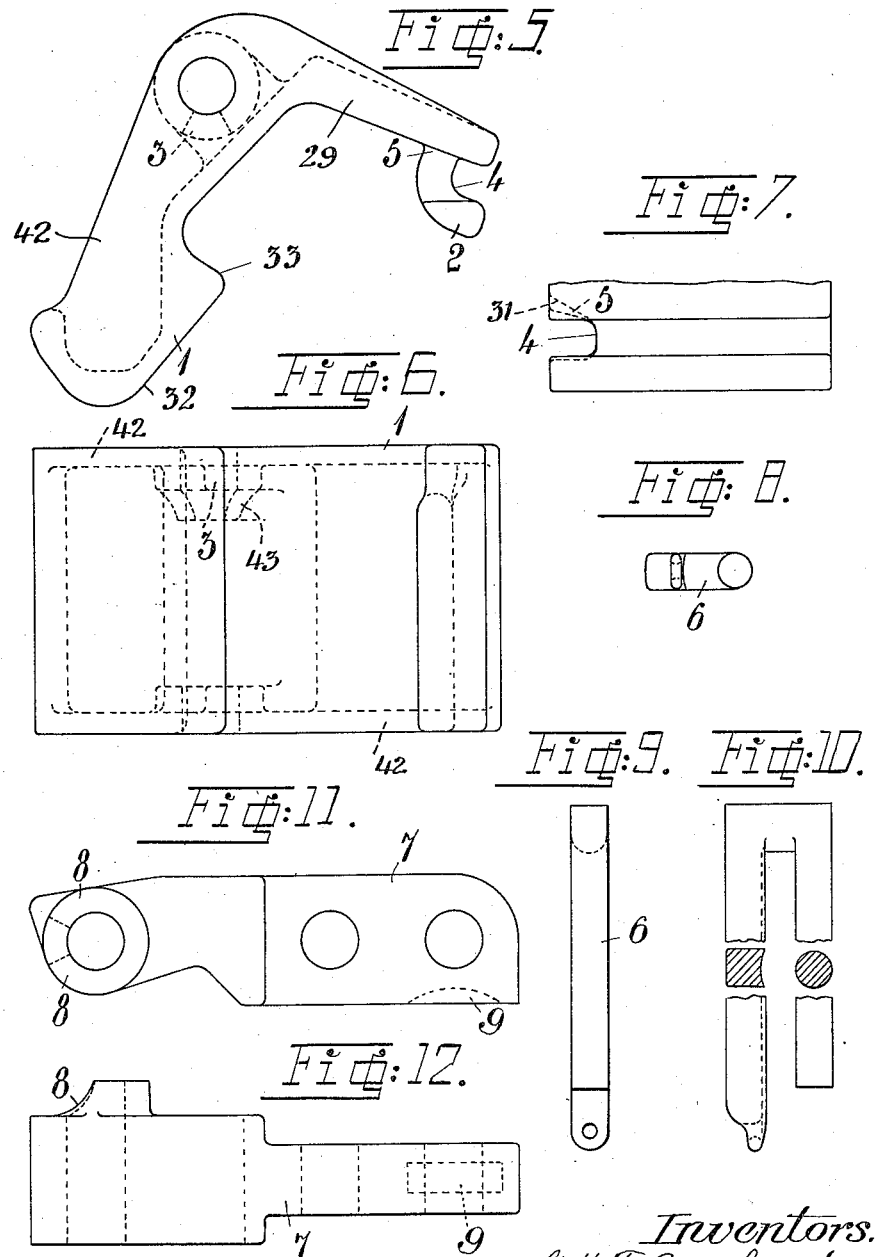

UNITED STATES PATENT OFFICE.

GUSTAF HENRIK FABIAN BERGLUND, OF STOCKHOLM, SWEDEN, AND HALDAN A. H. LINDENCRONA, DECEASED, BY MRS. HULDA MARIA ULRIKA LINDENCRONA, WIDOW AND HEIRESS OF SAID HALDAN A. H. LINDENCRONA, DECEASED.

AUTOMATIC CAR-COUPLING.

1,173,644.

Specification of Letters Patent. Patented Feb. 29, 1916.

Application filed June 16, 1910. Serial No. 567,277.

*To all whom it may concern:*

Be it known that GUSTAF HENRIK FABIAN BERGLUND, a subject of the King of Sweden, residing at Valhallavägen 83, Stockholm, Sweden, and HALDAN ADOLF HERMAN LINDENCRONA, deceased, have invented new and useful Improvements in Automatic Car-Couplings, of which the following is a specification.

The present invention relates to an automatic car-coupling, which will fulfil all reasonable requirements in a higher degree than those hitherto known, especially as far as concerns simplicity, reliability, low cost, weight, wear and sensitiveness for exterior unfavorable influence (as of snow, ice, dirt, etc.), facility of fitting and handling, of supervision, control and exchange of parts. Further the said coupling permits the retaining of a through draw-bar and the coupling together without difficulty of cars provided with the same and such provided with a screw coupling. If side buffers are used when the coupling is first introduced on the rolling stock of a railway system, and if it is deemed advisable to exchange the same for a central buffer, this can also be easily accomplished by the use of the present invention, it being of course understood that such an alteration could not be done before the whole rolling stock has been provided with couplings according to the present invention. When the said alteration is made, a considerable reduction of the distance between the cars as compared with cars provided with side buffers and screw coupling is also obtained.

In the accompanying drawing, the invention is illustrated in different stages of its application on the cars of a railway system.

Figure 1 shows a side elevation and Fig. 2 a plan view of the invention as applied to cars provided with side buffers and adapted to be coupled also to cars provided with screw-couplings. Fig. 3 shows a side view corresponding to Fig. 1, illustrating the coupling together of one car with the present improved coupling and one car with a screw coupling. Fig. 4 shows a corresponding side elevation of the ends of two cars, the couplings of which are adapted only for coupling together with couplings of the same design. Fig. 5 shows a plan view, Fig. 6 an end view and Fig. 7 a partial side view of the coupler hook, Fig. 8 shows a plan view, Fig. 9 a side view and Fig. 10 a front view of the locking piece. Figs. 11 and 12 show respectively a plan view and a side view of the supporting piece for the coupler head.

Each end of a car according to the present invention is provided with a coupler-head consisting of a hook 1 and a locking piece 6 supported by the same. The former is rotatable around a vertical axis with respect to a supporting and connecting piece 7 which is supported by the car in a manner more specifically described hereinafter. The hook 1 is of sufficient height to insure a perfect engagement with the corresponding hook of another car even at the largest difference of height which may arise as a consequence of different compression of the car springs. The hook which is shown in detail in Figs. 5–7 has its front thrust surface 32 as well as its engaging surface 33 arranged obliquely with respect to the pulling direction, the angles of the said surfaces being such as to permit an automatic engagement as well as disengagement of two hooks under the influence of a force acting in the said pulling direction—provided of course that the hooks are free to rotate. At its rear end, the hook has a lateral projection 29 the front face of which is plane in its substance. The said projection at its outer edge terminates in a portion 2 with a forked profile, embracing a longitudinal vertical groove 4 and having at its upper end a recess 5. This portion 2 is destined to serve as a bearing for the locking piece 6 (see also Figs. 8–10), the said piece having two parallel longitudinal portions one of which is cylindrical (see the hatched surfaces in Fig. 10 which represent cross-sections of the portions) and adapted to be guided in the vertical groove 4 of the hook. The other longitudinal portion of the locking piece is adapted to move along the cylindrically shaped outside of the portion 2, while the cross-piece connecting the two longitudinal portions of the locking piece is destined to lie in the recess 5. The front face of the latter recess is perpendicular while the rear one 31 ascends helically so that the locking piece when rotated in rearward direction will also be lifted.

The coupling hook, on the side adapted to be directed outward and rearward, is provided with strengthening ribs 42 and lugs 3 arising from these. The upper one of the said lugs which are vertically above each other has a projection 43 on its lower side. The said projection has sloping side faces and is adapted to lie between corresponding projections 8 on the upper side of the piece 7 serving to support the hook. The latter is connected to the piece 7 by means of a vertical bolt 28 around which it can be rotated. In its normal position the projection 43 lies between the projections 8 in the aforesaid manner, but when the hook is swung to the side from said position, it is also lifted by the projections 43 and 8 engaging each other. As long as the sloping faces of the said projections bear against each other, the hook thus always tends to return to its normal position under the influence of gravity.

The dimensions of the coupling hooks and of the locking pieces are such that when the former are in engagement and the latter occupy their normal positions in the bottom of the recesses 5, the locking pieces prevent any appreciable rotation of the hooks and thus keep them in a perfectly safe engagement. It is also quite impossible for the hooks to cause any displacement of the locking pieces, because any pull in the hooks will tend to rotate the locking pieces forward, in which direction they are checked by the vertical front face of the recesses 5. On the other hand, as soon as only one of the locking pieces is rotated in a rearward direction (until checked by the plane surface of the projection 29) and retained in this position, the hooks will be free from each other so as to be disengaged. The mechanism for effecting the said rearward rotation of the locking piece comprises a chain 26 connecting the lower end of the swinging portion of said locking piece to a lever arm 24 situated beneath the car. The said lever arm is pivoted on a vertical bolt 48 and provided with a downwardly projecting pin 25. In the path of the latter, when the lever is swung around the bolt 48, is movable a blade 22 on a shaft 19 transversely mounted on bearings beneath the car. This shaft can be rotated by means of lever arms 30 at both ends, preferably consisting of bent parts of the shaft itself and provided with counterpoises 23 at their ends. The lever arms 30, the blade 22 and the pin 25 are so positioned with respect to each other, that when the arms 30 are turned about three quarters of a revolution from their normal, hanging-down position, the blade 22 will move the arm 24 so as to tighten the chain 26 and rotate the locking piece 6 backward. This motion of the locking piece being permitted only until it is checked by the projection 29, the arm 24 will also be checked in such a position as to prevent further movement of the blade 22 and the shaft 19. As the shaft has a tension to perform such further movement under the influence of the counterpoises 23, said counterpoises now occupying the position shown in dash and dotted lines in Fig. 1, all the operating parts will remain in the position now described until the checking of the locking piece ceases. Thus, when it is desired to disconnect two cars which are coupled together, it is only necessary to turn one of the levers 30 of any of the cars about three quarters of a revolution, and then the car may be left for any time, the coupling being still disconnected. When the cars thus disconnected are drawn apart, both the hooks must be swung through a small angle in the clock-wise direction, in order to get free from one another, as can be seen from Fig. 2. This movement only will cause a slight pull in the chains 26, that one of said chains which is tightened before thus moving the parts 24, 25, 22 etc., somewhat back again and lifting the counterpoises 23 a little. As soon, however, as the hook 1 chain of which is tightened has become free from the other hook, it will yield to the tension of the chain and move in the opposite direction until the blade 22 has got free from the pin 25. Then, all the parts will return to their original positions by gravity, viz. the counterpoises will fall down to the position shown in full lines in Fig. 1, the locking piece 6 will slide on the face 31 and the hook will slide on the face 8 until restored to their normal position. Thus, the original conditions of the coupling are all quite automatically restored as soon as the cars are drawn apart. When, on the contrary, two cars are to be coupled together, it is not necessary to perform any manual operations at all. The hooks of the two cars, by the engagement of their front thrust surfaces, will swing each other to the side sufficiently to permit the engaging surfaces 32 to pass by each other. Further, the hooks will automatically push away the locking pieces which then are moved up along the sloping surfaces 31 and will return automatically as soon as the hooks have come into proper engagement.

If a tension is prevailing in the train or in a set of cars, this of course causes a pressure between the coupling member and thus also a frictional resistance against a movement of the same. In ordinary car-couplings, such a tension thus prevents any handling of the coupling, whence the cars must be pushed together before the coupling parts can be handled in any way. In the present case, this is not necessary on account of the loose connection—by means of the chain 26—between the coupler head proper and the operating mechanism and on account of the construction of the latter. The said features make it possible to perform the total manual operation which is necessary for the uncoupling—viz. to rotate the levers 30—notwithstanding any tension in the train and frictional contact between the coupling members. For accomplishing the final disconnection, it is only necessary to push together the train for a moment immediately before its pulling apart, said pushing movement acting to release the locking pieces which then under the influence of the tension in the chain will effect the uncoupling.

During shunting operations it is often desirable to put the coupling out of function. This is accomplished by means of the following arrangement. Each of the operating shafts 19 is supported in such way as to be somewhat reciprocatable in the longitudinal direction. This movement is limited by two flanges secured to the said shaft outside the bearings 35 of the same. One of the flanges is circular but the other flange 20 has the shape of a circular segment only and the bearing 35—adjacent to the same has a projection 36 provided with a notch 21 into which the flange 20 may be engaged by a longitudinal movement of the shaft when the said shaft occupies the angular position shown in dash and dotted lines in Fig. 1. As this position corresponds to the retired position of the locking piece, this latter may be locked in its retired position by pushing the shaft 19 longitudinally so far as to bring the segmental flange 20 into engagement with the notch 21. The blade 22 is of sufficient width to permit such movement without losing its engagement with the pin 25. As will be seen from the foregoing description, the retiring of one of the locking pieces 6 is sufficient to permit the hooks to move freely out of—and of course also into—engagement with each other. Thus the cars during shunting operations may be pushed against each other without being coupled together.

When the automatic coupling hereabove described is first introduced on a railway system, it is generally not practicable to provide all the cars of the system with the new coupling at once, and cars having the said new coupling must therefore be so arranged that they can be readily coupled together with such having a coupling of the type used before. Assuming that this last-mentioned type is a screw coupling, an arrangement of the improved coupling which is found suitable for the purpose is shown in the drawing, Figs. 1 and 2, and its manner of operation particularly in Fig. 3.

The afore-mentioned piece 7 (shown in detail in Figs. 11 and 12) serving to support the coupler head proper is not made integrally with the continuous draw-bar and not even permanently secured to the same but connected to a piece 10 forming part of the draw-bar and projecting through the buffer beam by means of two vertical bolts 16, 17 running through the piece 7 and the forked piece 10. One of these bolts 16, which carries an emergency coupling link 27, may be permanently held in place by means of a cotter or taper pin, but the other bolt 17 is preferably held in place only by its own weight. Thus, when the car is to be coupled to a car provided with screw coupling (Fig. 3), the bolt 17 is lifted out which operation allows the piece 7 to be swung to the side around the bolt 16. Then the connecting link 37 of the screw-coupling of the other car is introduced into the forked piece 10—a recess 9 in the piece 7 permitting such introduction—whereupon the bolt 16 is again inserted and keeps the link 37 in place. Finally, the emergency link 27 is hooked into the emergency hook of the other car. When, on the other hand, all the cars of a railway system have been provided with the present improved coupling, it may be desirable to remove the side buffers, if such have been used before, and to use the coupling itself as a central buffer. This is made possible in the present case by the following arrangement. The forked piece 10 projecting through the buffer beam is cylindrical in its rear portion and also provided with a cylindrical bore which embraces the cylindrical end portion of the draw bar 11. These two parts are connected together by means of a wedge 13, though the connection is not rigid, but permitting the displacement of the whole coupling backward (toward the center of the car) from its normal position. This is accomplished by making the slot in the draw-bar for the wedge broader than the wedge itself which latter is rigidly secured in the sleeve portion of the piece 10. For normally holding the piece 10—and thereby the coupler head—in its outmost position, a helical spring 14 is interposed between a flange 38 on the draw-bar 11 and a washer 39 resting against the rear end of the piece 10. The said spring 14 is of comparatively tiny dimensions and is not destined to serve as a real buffer spring, but only to permit the coupler-head to follow the movements of the side buffers when the strong springs of the latter are compressed. In order, however, to facilitate a quick and ready change to the final state, when the coupler-head has to serve as a buffer alone, it is initially provided with a strong buffer spring 15, but the said spring as long as the side buffers remain in place, rests in an uncompressed state between the aforesaid washer 39 and another washer 40 resting against a shoulder 41 on the piece 10 so as to perform no action. The shoulder 41 is preferably formed between the cylindrical rear portion and the square front portion of the piece 10. When it is desired to remove the side buffers and to cause the coupler head to act as a central buffer, the link 27 suspended from the bolt 16 is first removed and the bolt itself pulled out (it may be exchanged for another bolt if desired) in order to make it possible to move the whole coupler-head inward and thus shorten the distance between the cars. Simultaneously, the chain 26 is shortened to a corresponding degree. The wedge 13 is loosened, and then the whole coupler-head is moved toward the center of the car until the rear or inner end of the spring 15 will come to rest against the central portion of a bow 18 secured to the corners of the car frame. (The washer 39 has been previously removed by pulling out the coupler-head so far that the said washer will get free from the draw-bar 11. The spring 14 now will lie loosely inside the sleeved portion of the piece 10 and will not have to do any more service). When the coupler-head is in this position, the front end of the wedge-slot in the draw-bar will register with another slot 44 in the piece 10 in which the wedge 13 is now inserted. Now, the spring 15 will act as a buffer spring, being compressed between the flange 40 and the bow 18 when two cars are pushed against each other.

When all the cars of a railway system have been provided with the present improved coupling and the just described alterations have been performed, it is of course not necessary, when manufacturing new cars for the same system, to manufacture these cars in quite the same way as those above described which have been altered from the earlier period. The difference between a car of the former and one of the latter kind can be seen from Fig. 4 where the right hand side shows a car which has been altered from the transitory period while the left hand side shows a car especially manufactured for the final period. On this latter car, the member connecting the coupler-head with the draw-bar 11 is in one single piece 7 instead of in two and of course has only one slot for the wedge 13. Further, the bow 18 serving as a seat for the buffer spring has a more flattened shape which is a consequence of the former arrangement.

What is claimed is—

1. In an automatic car-coupling, the combination of a supporting member provided with cam surfaces, a coupling hook rotatable around a vertical axis with respect to the car frame and provided with cam surfaces coacting with the cam surfaces on said supporting member to lift the hook when rotated from its normal position, a locking piece carried by said coupling hook and rotatable around a vertical axis with respect thereto, said hook having surfaces to lift said locking piece when rotated in a certain direction, and means for rotating the said locking piece, the coupling hook being provided with oblique surfaces for engaging corresponding surfaces of another coupling hook and with other surfaces to be engaged by the locking piece so as to permit the disengaging of two coupling hooks by rotating only one of the locking pieces.

2. In an automatic car-coupling, the combination of a supporting member provided with cam surfaces, a coupling hook rotatable around a vertical axis with respect to the car frame and provided with cam surfaces coacting with the cam surfaces on said supporting member to lift the hook when rotated from its normal position, a locking piece carried by said coupling hook and rotatable around a vertical axis with respect thereto, said hook having surfaces to lift said locking piece when rotated in a certain direction, and means for rotating said locking piece, said coupling hook having an abutting surface serving to check the relative movement of the said locking-piece with respect thereto so as to move both these parts together, after the coupling hook has been disengaged.

3. In an automatic car-coupling, the combination of a supporting member provided with cam surfaces, a coupling hook rotatable around a vertical axis with respect to the car frame and provided with cam surfaces coacting with the cam surfaces on said supporting member to lift the hook when rotated from its normal position, a locking piece carried by said coupling hook and rotatable around a vertical axis with respect thereto, said hook having surfaces to lift said locking piece when rotated in a certain direction, lever mechanism carried by the car, means for rotating said locking-piece comprising a flexible member connecting said piece to said lever mechanism, means for rotating said lever mechanism less than one revolution and thereby tightening said flexible member and means, operated by gravity, for completing the revolution when the coupling yields to the tension of said flexible member.

In testimony whereof I, GUSTAF HENRIK FABIAN BERGLUND, and I, HULDA MARIA ULRIKA LINDENCRONA, widow after and heiress of the said HALDAN ADOLF HERMAN LINDENCRONA, have signed our names to this specification in the presence of two subscribing witnesses.

GUSTAF HENRIK FABIAN BERGLUND.
HULDA MARIA ULRIKA
   LINDENCRONA, NÉE FLIORT OF ORNÄS.

Witnesses:
  BIRGER NORDFELDT,
  GRETA PRIEU.